(12) United States Patent
Truong et al.

(10) Patent No.: US 11,468,240 B2
(45) Date of Patent: Oct. 11, 2022

(54) SYSTEM AND METHOD FOR USING MACHINE LEARNING SUPPORTING NATURAL LANGUAGE PROCESSING ANALYSIS

(71) Applicant: Raytheon Company, Waltham, MA (US)

(72) Inventors: Tony T. Truong, Tucson, AZ (US); Larissa C. Maksi, Tucson, AZ (US); William G. Matola, Tucson, AZ (US); Nicholas W. Barrett, Oro Valley, AZ (US)

(73) Assignee: Raytheon Company, Waltham, MA (US)

( * ) Notice: Subject to any disclaimer, the term of this patent is extended or adjusted under 35 U.S.C. 154(b) by 394 days.

(21) Appl. No.: 16/715,198

(22) Filed: Dec. 16, 2019

(65) Prior Publication Data

US 2021/0182495 A1    Jun. 17, 2021

(51) Int. Cl.
*G06F 40/30* (2020.01)
*G06N 20/00* (2019.01)
*G06F 16/2457* (2019.01)

(52) U.S. Cl.
CPC ......... *G06F 40/30* (2020.01); *G06F 16/2457* (2019.01); *G06N 20/00* (2019.01)

(58) Field of Classification Search
None
See application file for complete search history.

(56) References Cited

U.S. PATENT DOCUMENTS

| | | |
|---|---|---|
| 7,050,987 B2 | 5/2006 | Lettovsky et al. |
| 7,173,532 B2 | 2/2007 | Hanle et al. |
| 7,440,947 B2 | 10/2008 | Adcock et al. |
| 7,483,892 B1 | 1/2009 | Sommer et al. |
| 9,916,564 B1 | 3/2018 | Johns et al. |
| 9,940,840 B1 | 4/2018 | Schubert et al. |
| 10,339,814 B2 | 7/2019 | Liang et al. |

(Continued)

OTHER PUBLICATIONS

International Search Report and Written Opinion of the International Searching Authority in connection with International Patent Application No. PCT/US2020/023701 dated Aug. 14, 2020, 10 pages.

(Continued)

*Primary Examiner* — Nafiz E Hoque (57) ABSTRACT

A system includes at least one memory configured to store multiple free-form text-based descriptions comprising descriptions of upcoming travels by multiple users. The system also includes at least one processor coupled to the at least one memory. The at least one processor is configured to perform natural language processing to generate vectors representing the free-form text-based descriptions in a feature space. The at least one processor is also configured to identify similarities between multiple pairs of the vectors in the feature space. The at least one processor is further configured to identify at least two of the free-form text-based descriptions as being related based on the identified similarities. In addition, the at least one processor is configured to generate an output indicating that the at least two free-form text-based descriptions are associated with related travels by at least two users.

20 Claims, 5 Drawing Sheets

(56) References Cited

U.S. PATENT DOCUMENTS

| | | |
|---|---|---|
| 2006/0259481 A1 | 11/2006 | Handley |
| 2008/0091445 A1 | 4/2008 | Mihic |
| 2008/0228887 A1 | 9/2008 | Robertson et al. |
| 2011/0225159 A1* | 9/2011 | Murray ................. G06F 16/358 707/739 |
| 2011/0302124 A1 | 12/2011 | Cai et al. |
| 2013/0086553 A1 | 4/2013 | Grechanik |
| 2013/0218615 A1* | 8/2013 | Fredericks ............. G06Q 40/12 705/6 |
| 2016/0125502 A1 | 5/2016 | Byron et al. |

OTHER PUBLICATIONS

Hao et al., "Equip Tourists with Knowledge Mined from Tavelogues," Proceedings of the 19th International Conference on World Wide Web, Apr. 2010, 10 pages.

Fan et al., "Spontaneous Speech Parsing in Travel Information Inquiring and Booking Systems", Journal of Computer Science and Technology, vol. 17, No. 6, Nov. 2002, p. 924-932.

* cited by examiner

SYSTEM AND METHOD FOR USING MACHINE LEARNING SUPPORTING NATURAL LANGUAGE PROCESSING ANALYSIS

TECHNICAL FIELD

This disclosure is generally directed to machine learning systems. More specifically, this disclosure is directed to a system and method for using machine learning to support natural language processing analysis.

BACKGROUND

Large organizations often have numerous employees or other personnel who travel and interact with people outside their organizations. For example, a large company may have many employees who travel to different locations in order to have meetings or otherwise engage with suppliers, customers, distributors, or other parties. It is often difficult for personnel in a large organization to coordinate activities with outside parties, particularly across geographical and organizational boundaries (such as different divisions within the same company).

SUMMARY

This disclosure relates to a system and method for using machine learning to support natural language processing analysis.

In a first embodiment, a system includes at least one memory configured to store multiple free-form text-based descriptions including descriptions of upcoming travels by multiple users. The system also includes at least one processor coupled to the at least one memory. The at least one processor is configured to perform natural language processing to generate vectors representing the free-form text-based descriptions in a feature space. The at least one processor is also configured to identify similarities between multiple pairs of the vectors in the feature space. The at least one processor is further configured to identify at least two of the free-form text-based descriptions as being related based on the identified similarities. In addition, the at least one processor is configured to generate an output indicating that the at least two free-form text-based descriptions are associated with related travels by at least two users.

In a second embodiment, a non-transitory computer readable medium contains instructions that when executed cause at least one processor to obtain multiple free-form text-based descriptions including descriptions of upcoming travels by multiple users. The medium also includes instructions that when executed cause the at least one processor to perform natural language processing to generate vectors representing the free-form text-based descriptions in a feature space. The medium further includes instructions that when executed cause the at least one processor to identify similarities between multiple pairs of the vectors in the feature space and identify at least two of the free-form text-based descriptions as being related based on the identified similarities. In addition, the medium includes instructions that when executed cause the at least one processor to generate an output indicating that the at least two free-form text-based descriptions are associated with related travels by at least two users.

In a third embodiment, a method includes obtaining multiple free-form text-based descriptions including descriptions of upcoming travels by multiple users. The method also includes performing natural language processing to generate vectors representing the free-form text-based descriptions in a feature space. The method further includes identifying similarities between multiple pairs of the vectors in the feature space and identifying at least two of the free-form text-based descriptions as being related based on the identified similarities. In addition, the method includes generating an output indicating that the at least two free-form text-based descriptions are associated with related travels by at least two users.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

FIGS. 1 through 5, described below, and the various embodiments used to describe the principles of the present invention in this patent document are by way of illustration only and should not be construed in any way to limit the scope of the invention. Those skilled in the art will understand that the principles of the present invention may be implemented in any type of suitably arranged device or system.

As noted above, large organizations often have numerous employees or other personnel who travel and interact with people outside their organizations. Within an organization, personnel tend to collaborate with the people they know, and the people they know tend to be close in terms of geographical or organizational proximity. In other words, personnel tend to collaborate with (i) other personnel who are geographically close (such as in a common building or campus) and/or (ii) other personnel within the same organizational unit (such as a common division within a company).

Unfortunately, these and other factors often make it difficult for personnel to coordinate their activities with outside parties, particularly across geographical and organizational boundaries. Because of this, it is not uncommon for different people in the same organization to engage in multiple activities with the same outside party at or around the same time, without any knowledge of each other's activities. While some approaches have been developed that look for overlapping travel itineraries of multiple travelers, these approaches typically operate based solely on whether the different travel itineraries overlap.

This disclosure provides various machine learning techniques that can be used to perform natural language processing analysis. As described in more detail below, in some embodiments, these techniques can be used to receive a user query from a specified user, where the user query includes, identifies, or is otherwise associated with a free-form text-based description. In particular embodiments, this free-form text-based description may represent a textual description of the purpose for the specified user's upcoming travel. Data filtering or other techniques may be used to identify other free-form text-based descriptions based on the user query. In particular embodiments, these free-form text-based descriptions may represent textual descriptions of the purposes for other user's upcoming travels and may be identified based on whether the other users' travels overlap or are otherwise identical or similar in location and time with the specified user's travel.

Natural language processing analysis occurs using the various text-based descriptions identified above. For example, in some embodiments, latent semantic analysis (LSA) or other machine learning technique is performed to identify which of the other users' text-based descriptions appear most related to the specified user's text-based description. This may involve converting the various text-based descriptions into vectors, such as by performing latent semantic indexing (LSI) followed by singular value decomposition (SVD). The resulting vectors represent the meanings of the various text-based descriptions as embedded in a defined feature space. The level of similarity between two text-based descriptions can then be identified based on the distance or other measure between their associated vectors in the feature space. The similarity between vectors can be measured in various ways, such as Euclidean distance or cosine similarity. Thus, a machine learning technique can be used here to identify which other users' text-based descriptions are most similar to the specified user's text-based description. This information can then be used to perform various functions. For instance, in the travel example provided above, travel itineraries and/or text-based descriptions associated with other users whose upcoming travels are most similar to the specified user's upcoming travel can be identified and output to the specified user. As another example, notifications may be automatically generated and provided to different users identifying the relatedness of their upcoming travels.

In other embodiments, the latent semantic analysis or other machine learning technique may be performed based on various free-form text-based descriptions without being based on a particular user input query. In these embodiments, the latent semantic analysis or other machine learning technique can still be used to identify related text-based descriptions, such as by generating vectors representing the text-based descriptions and identifying relatively small distances between various pairs of vectors in the feature space. This information can again be used to perform various functions. For instance, in the travel example provided above, notifications may be automatically generated and provided to different users identifying the relatedness of their upcoming travels. In either case, machine learning and natural language processing analysis can be used to help identify overlapping activities, support more effective collaboration between different personnel, or achieve other benefits depending on the information being analyzed.

Figure 1:
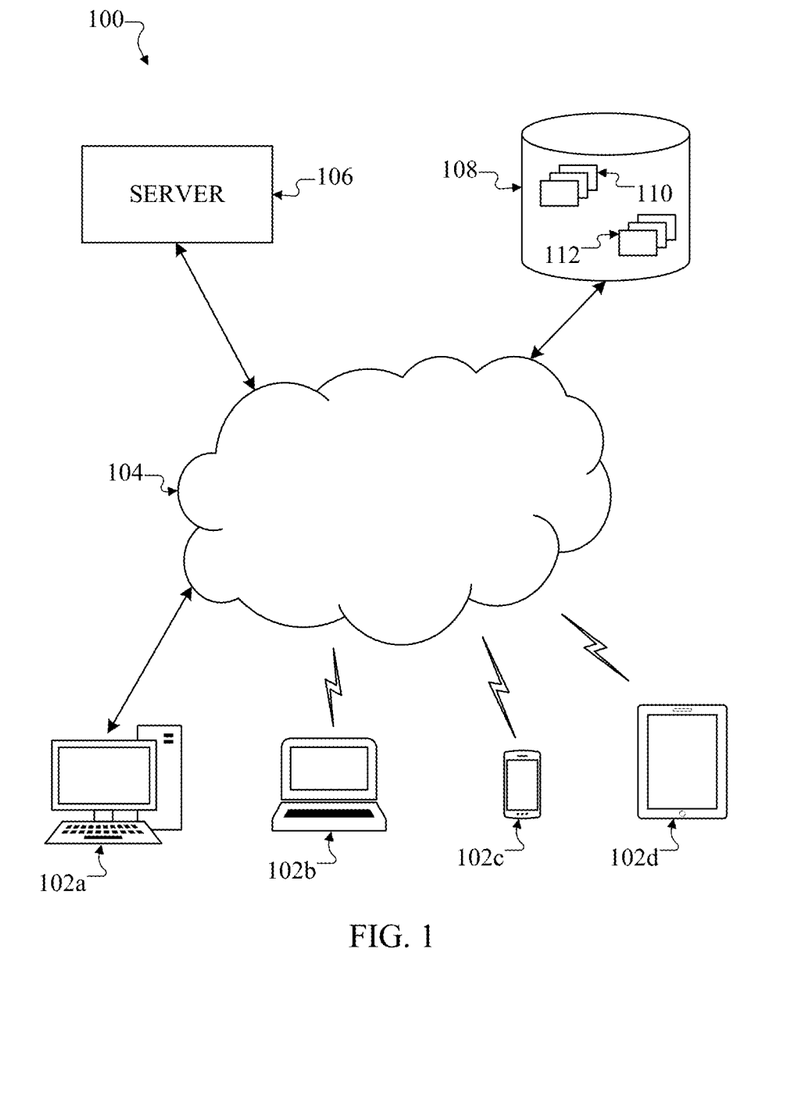
FIG. 1 illustrates an example system for using machine learning to support natural language processing analysis according to this disclosure.

FIG. 1 illustrates an example system 100 for using machine learning to support natural language processing analysis according to this disclosure. As shown in FIG. 1, the system 100 includes multiple user devices 102a-102d, at least one network 104, at least one server 106, and at least one database 108. Note, however, that other combinations and arrangements of components may also be used here.

In this example, each user device 102a-102d is coupled to or communicates over the network 104. Communications between each user device 102a-102d and a network 104 may occur in any suitable manner, such as via a wired or wireless connection. Each user device 102a-102d represents any suitable device or system used by at least one user to provide information to the server 106 or database 108 or to receive information from the server 106 or database 108. Example types of information may include user queries, free-form text-based descriptions, natural language processing results, and notifications. In this document, the phrase "text-based description" generally refers to text that describes an activity and that is provided by or otherwise based on information from a user, and the phrase "free-form" generally refers to the text-based description having an unstructured or otherwise non-predefined format or content.

Any suitable number(s) and type(s) of user devices 102a-102d may be used in the system 100. In this particular example, the user device 102a represents a desktop computer, the user device 102b represents a laptop computer, the user device 102c represents a smartphone, and the user device 102d represents a tablet computer. However, any other or additional types of user devices may be used in the system 100. Each user device 102a-102d includes any suitable structure configured to transmit and/or receive information.

The network 104 facilitates communication between various components of the system 100. For example, the network 104 may communicate Internet Protocol (IP) packets, frame relay frames, Asynchronous Transfer Mode (ATM) cells, or other suitable information between network addresses. The network 104 may include one or more local area networks (LANs), metropolitan area networks (MANs), wide area networks (WANs), all or a portion of a global network such as the Internet, or any other communication system or systems at one or more locations. The network 104 may also operate according to any appropriate communication protocol or protocols.

The server 106 is coupled to the network 104 and is coupled to or otherwise communicates with the database 108. The server 106 supports the retrieval of information from the database 108 and the processing of that information. Of course, the database 108 may also be used within the server 106 to store information, in which case the server 106 may store the information itself.

Among other things, the server 106 processes information using natural language processing analysis. For example, in some embodiments, the server 106 receives a user query from a specified user of a user device 102a-102d, where the user query includes, identifies, or is otherwise associated with a free-form text-based description. Based on the user query, the server 106 searches the database 108 to retrieve text-based descriptions associated with other users. The server 106 uses natural language processing to analyze the retrieved text-based descriptions and identify which of the other users' text-based descriptions are most similar to the specified user's text-based description. The server 106 then generates one or more outputs based on the analysis, such as by outputting the most-related text-based descriptions (or information associated with the most-related text-based descriptions) to the user via the user device 102a-102d or by generating notifications to users whose text-based descriptions are most related. Each notification may take any suitable form(s), such as an electronic mail (e-mail) message, text message, or alert or other message presented on an intended recipient's user device 102a-102d. In other embodiments, the server 106 identifies related text-based descriptions without relying on user input and generates one or more outputs based on the analysis.

As a particular example of this functionality, the server 106 may receive a user query containing information that identifies a specified user, and the server 106 may obtain an itinerary and a text-based description associated with the specified user's upcoming travel. The itinerary and text-based description may be part of the user query itself or may be received from another source, such as the database 108. The text-based description may include a textual description of the purpose for the specified user's upcoming travel. The itinerary for the specified user's upcoming travel may be used to identify other users having overlapping travel plans, such as by identifying other users' itineraries that at least partially overlap with the specified user's itinerary in terms of the same or similar location(s) and the same or similar timeframe(s). Text-based descriptions associated with the other users who have overlapping travel plans may be retrieved from the database 108, and these text-based descriptions may include textual descriptions of the purposes for the other users' upcoming travels. The server 106 may then use natural language processing to analyze the text-based descriptions and identify which of the other users (if any) have overlapping travel itineraries that appear to be for the same or similar purpose as the specified user. If related travels are identified, the server 106 may output information identifying or associated with the related travel itineraries or other information to the specified user, or the server 106 may generate notifications to multiple users associated with the related travel itineraries.

Note that, in some embodiments, the server 106 may perform additional functions based on additional information that is associated with various users. For example, the server 106 may have access to additional information associated with the users who have provided text-based descriptions, such as the users' employment fields or disciplines. When the server 106 outputs information identifying related text-based descriptions in response to a user query, the server 106 may provide an indication of which of the related text-based descriptions were provided by users who are in the same or similar employment field(s) or discipline(s) as the user who submitted the query. Taking the travel example above, this may allow a specified user to submit a query and receive an identification of other users traveling for same or similar purpose, and the server 106 may flag any of the related travels that are for users in the same or similar employment field(s) or discipline(s) as the specified user. The flagging may take any suitable form, such as by highlighting or placing a certain icon next to related travels that are for users in the same or similar employment field(s) or discipline(s) as the specified user. Note that the use of employment fields or disciplines is for illustration only and that other information may be used to identify possible relationships between users.

The server 106 includes any suitable structure configured to process free-form text-based descriptions using natural language processing analysis. In some embodiments, the server 106 includes one or more processors, one or more memories, and one or more communication interfaces. Note, however, that the server 106 may be implemented in any suitable manner to perform the described functions. Also note that while described as a server here, the device(s) actually implementing the server 106 may represent one or more desktop computers, laptop computers, server computers, or other computing or data processing devices or systems.

The database 108 stores various information used, generated, or collected by the server 106 and the user devices 102a-102d. For example, the database 108 may store various free-form text-based descriptions 110, which can be provided by or otherwise based on information from users via the user devices 102a-102d. Since the text-based descriptions 110 are free-form, the text-based descriptions 110 may have a wide variety of lengths, contents, and formats. The database 108 may also store additional information 112 related to the text-based descriptions 110. Among other things, the additional information 112 can be used by the server 106 to select which text-based descriptions 110 to retrieve and process based on a user query. When used in the travel example above, for instance, the additional information 112 may include various itineraries or other travel-related information associated with various users' upcoming travels. Each travel itinerary may typically include a departure location where a traveler begins and one or more destination locations where a traveler stays for at least some period of time. Each travel itinerary may also typically include times and dates when the traveler will leave the departure location, arrive at and leave each destination location, and arrive back at the original departure location (or some other final destination).

As noted above, in some embodiments, the text-based descriptions 110 may include text defining the purposes associated with travel itineraries included in the additional information 112. For example, a text-based description 110 may be provided by a traveler (via a user device 102a-102d) and identify the reason why the traveler is taking a trip. As particular examples, a text-based description 110 may identify why a traveler is taking a trip and any parties with whom the traveler is meeting during the trip. Since the text-based descriptions 110 represent free-form textual descriptions of various users' travels, the text-based descriptions 110 may vary significantly, such as in terms of length, content, and level of detail. Despite this, the server 106 can analyze the text-based descriptions 110 using machine learning techniques to discern relationships associated with various users' travels and take action based on the identification of related travels.

Note that while the text-based descriptions 110 here are shown as being separate from the additional information 112, this is for convenience of illustration and explanation only. Since data can be stored and associated in any number of ways in a database 108 or other storage, the text-based descriptions 110 and the additional information 112 may be stored in any suitable manner (whether in a combined or further subdivided manner).

There are a number of possible ways to implement the system 100 in order to provide the described functionality for identifying related free-form text-based descriptions 110. For example, in some embodiments, the server 106 and database 108 are owned, operated, or managed by a common entity. In other embodiments, the server 106 and database 108 are owned, operated, or managed by different entities. In the context of travel, this may allow a single organization to manage its own personnel's travels or allow one organization to manage the travels of a different organization's personnel. Note, however, that this disclosure is not limited to any particular organizational implementation.

Although FIG. 1 illustrates one example of a system 100 for using machine learning to support natural language processing analysis, various changes may be made to FIG.

1. For example, the system 100 may include any number of user devices 102a-102d, networks 104, servers 106, and databases 108. Also, while FIG. 1 illustrates that one database 108 is coupled to the network 104, any number of databases 108 may reside at any location or locations accessible by the server 106, and each database 108 may be coupled directly or indirectly to the server 106. In addition, while FIG. 1 illustrates one example operational environment in which machine learning can be used to support natural language processing analysis, this functionality may be used in any other suitable system.

Figure 2:
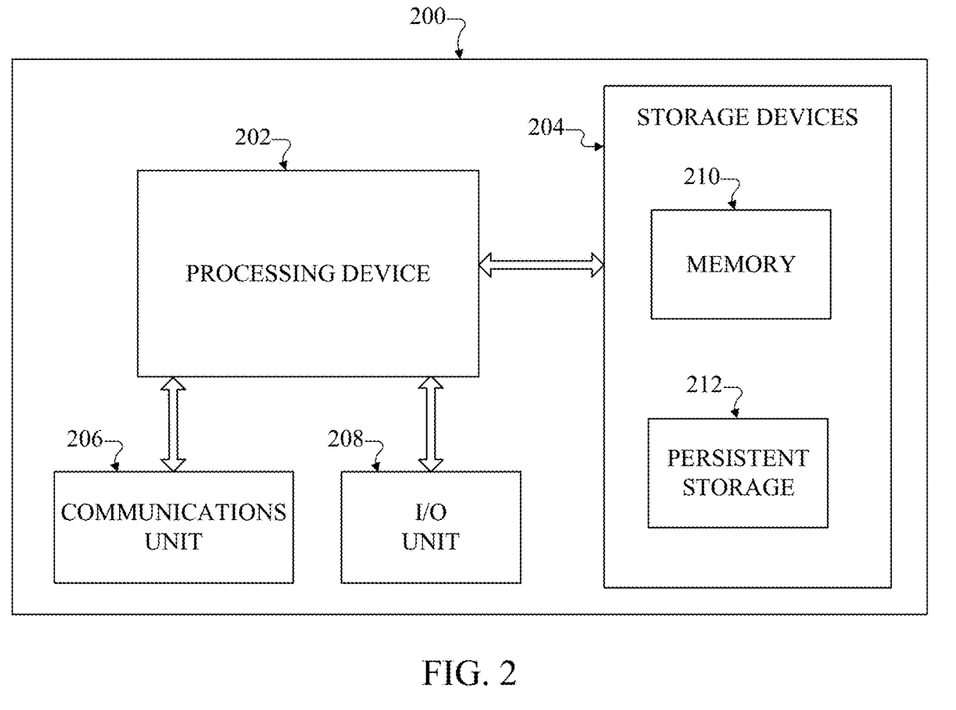
FIG. 2 illustrates an example device for using machine learning to support natural language processing analysis according to this disclosure.

FIG. 2 illustrates an example device 200 for using machine learning to support natural language processing analysis according to this disclosure. One or more instances of the device 200 may, for example, be used to at least partially implement the functionality of the server 106 of FIG. 1. However, the functionality of the server 106 may be implemented in any other suitable manner. Also, the same or similar arrangement of components may be used to at least partially implement the functionality of one or more of the user devices 102a-102d in FIG. 1. However, the functionality of each user device 102a-102d may be implemented in any other suitable manner.

As shown in FIG. 2, the device 200 denotes a computing device or system that includes at least one processing device 202, at least one storage device 204, at least one communications unit 206, and at least one input/output (I/O) unit 208. The processing device 202 may execute instructions that can be loaded into a memory 210. The processing device 202 includes any suitable number(s) and type(s) of processors or other devices in any suitable arrangement. Example types of processing devices 202 include one or more microprocessors, microcontrollers, digital signal processors (DSPs), application specific integrated circuits (ASICs), field programmable gate arrays (FPGAs), or discrete circuitry.

The memory 210 and a persistent storage 212 are examples of storage devices 204, which represent any structure(s) capable of storing and facilitating retrieval of information (such as data, program code, and/or other suitable information on a temporary or permanent basis). The memory 210 may represent a random access memory or any other suitable volatile or non-volatile storage device(s). The persistent storage 212 may contain one or more components or devices supporting longer-term storage of data, such as a read only memory, hard drive, Flash memory, or optical disc.

The communications unit 206 supports communications with other systems or devices. For example, the communications unit 206 can include a network interface card or a wireless transceiver facilitating communications over a wired or wireless network, such as the network 104. The communications unit 206 may support communications through any suitable physical or wireless communication link(s).

The I/O unit 208 allows for input and output of data. For example, the I/O unit 208 may provide a connection for user input through a keyboard, mouse, keypad, touchscreen, or other suitable input device. The I/O unit 208 may also send output to a display, printer, or other suitable output device. Note, however, that the I/O unit 208 may be omitted if the device 200 does not require local I/O, such as when the device 200 can be accessed remotely.

In some embodiments, the instructions executed by the processing device 202 can include instructions that implement the functionality of the server 106 described above. For example, the instructions executed by the processing device 202 can include instructions that perform natural language processing analysis functions, which may be used to process text-based descriptions 110 using natural language processing techniques in order to identify related descriptions.

Although FIG. 2 illustrates one example of a device 200 for using machine learning to support natural language processing analysis, various changes may be made to FIG. 2. For example, computing devices and systems come in a wide variety of configurations, and FIG. 2 does not limit this disclosure to any particular computing device or system.

Figure 3:
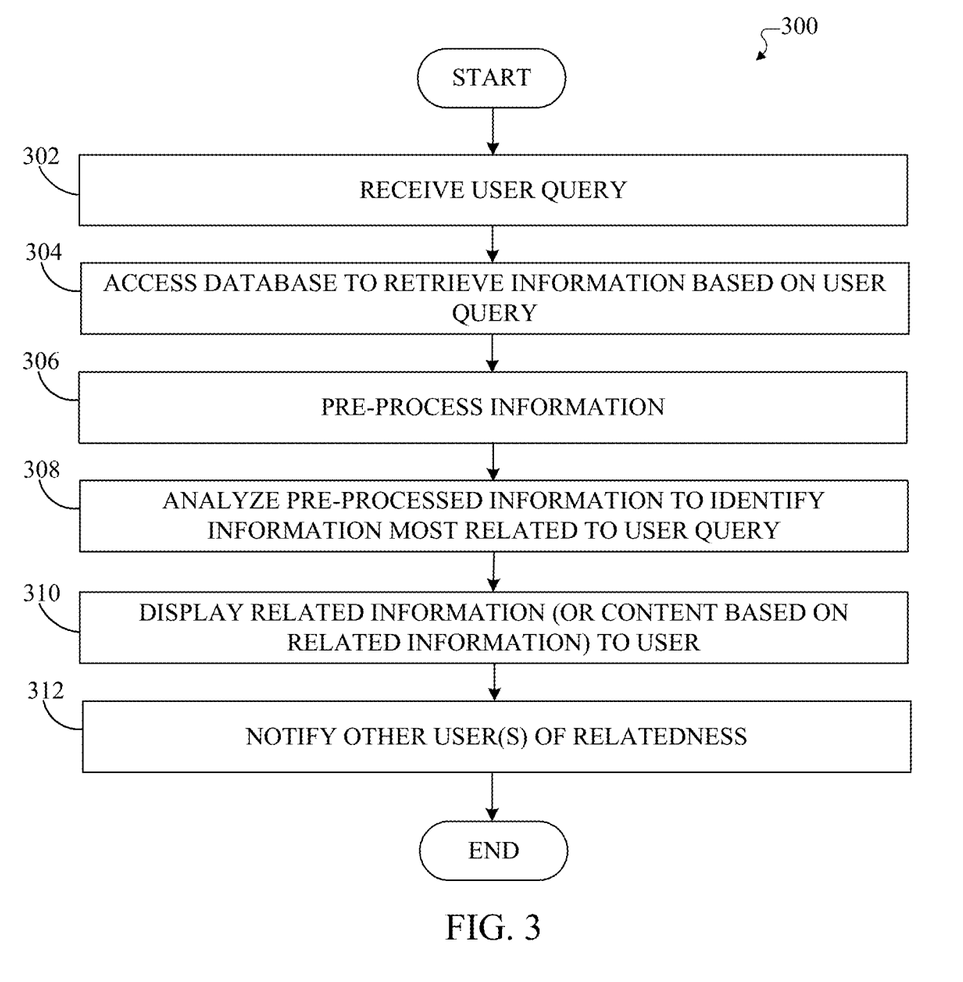
FIG. 3 illustrates an example method for using machine learning to support natural language processing analysis according to this disclosure.

FIG. 3 illustrates an example method 300 for using machine learning to support natural language processing analysis according to this disclosure. For ease of explanation, the method 300 of FIG. 3 may be described as being performed by the server 106 in FIG. 1, which may be implemented using the device 200 of FIG. 2. However, the method 300 may involve the use of any suitable device(s) in any suitable system(s).

As shown in FIG. 3, a user query is received at step 302. This may include, for example, the processing device 202 of the server 106 receiving a user query from a user device 102a-102d. In some embodiments, the user query can identify a specified user. The user query may also include (or may be used to obtain) additional information to be used by the server 106, such as a text-based description 110 associated with the specified user. As a particular example, the user query may include or be used to identify one or more travel destinations, one or more travel date ranges, and one or more trip purposes, or the user query may be used to access the database 108 and retrieve this information. The one or more trip purposes represent at least one free-form text-based description. Note that the user query itself may also or alternatively contain at least one free-form text-based description.

A database is accessed to retrieve information based on the user query at step 304. This may include, for example, the processing device 202 of the server 106 using information in or otherwise associated with the user query to retrieve various text-based descriptions 110 from the database 108. As a particular example, this may include using the travel destination(s) and travel date range(s) identified earlier to identify any other users who have overlapping travel itineraries with the specified user and retrieving at least the text-based descriptions 110 associated with those other users' travel itineraries from the database 108. This helps to filter or narrow down the text-based descriptions 110 from the database 108 to be further processed.

The obtained information (such as the user query, the information associated with the user query, and the retrieved information from the database) is pre-processed at step 306. This may include, for example, the processing device 202 of the server 106 processing this information to remove capitalization, punctuation, multiple whitespaces, and stop words (like "a", "an", "the", and "is"). This may also include the processing device 202 of the server 106 changing plural nouns to the singular form and converting all verb tenses to present tense (sometimes referred to as "lemmatizing"). This helps to standardize the form of the various information to be further processed, such as by removing common differences between the same or similar words used in text-based descriptions.

Figure 4:
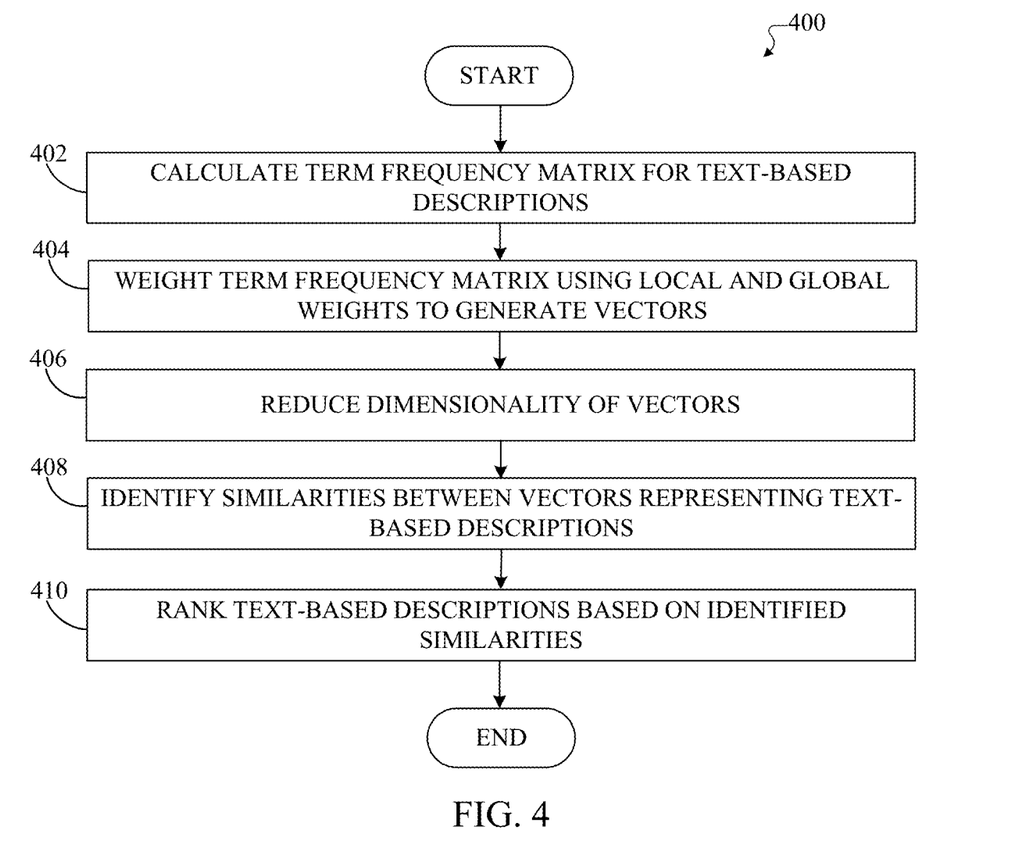
FIG. 4 illustrates an example method for identifying a similarity of information using natural language processing analysis according to this disclosure.

The pre-processed information is analyzed to identify which of the retrieved information is most related (relevant) to the user query at step 308. This may include, for example, the processing device 202 of the server 106 performing latent sematic analysis or other machine learning technique to convert various "documents" into vectors. Here, one document may represent the text-based description associated with the user query, and the other documents may represent the text-based descriptions 110 retrieved from the database 108 based on the user query. This may also include the processing device 202 of the server 106 computing a distance or other similarity measure between the vector representing the text-based description associated with the user query and each vector representing one of the text-based descriptions 110 retrieved from the database 108. This may further include the processing device 202 of the server 106 determining which of the similarities (if any) are suitably low (such as for Euclidean distance) or suitably high (such as for cosine similarity). This is based on the knowledge that the vectors for two documents are close to parallel (and therefore have a smaller Euclidean distance or larger cosine similarity) when the documents are similar to each other, while the vectors for two documents are close to orthogonal (and therefore have a larger Euclidean distance or smaller cosine similarity) when the documents are not similar to each other in semantic term or theme. One example process for performing this step is shown in FIG. 4, which is described below.

The results of the analysis may be used in any suitable manner. In this example, the most-related information (or content based on the most-related information) is displayed to the user at step 310. This may include, for example, the processing device 202 of the server 106 presenting the text-based descriptions 110 deemed most-related to the user's text-based description to the user, such as in a list, via the user's device 102a-102d. The text-based descriptions 110 that are presented to the user can be ranked, such as in order of increasing calculated Euclidean distance or decreasing calculated cosine similarity (which means in order of decreasing relatedness). In some embodiments, actual similarity scores may be computed for the related text-based descriptions 110, and the similarity scores may be presented along with the text-based descriptions 110 to the user. One or more notifications are sent to one or more other users of the determined relatedness at step 312. This may include, for example, the processing device 202 of the server 106 identifying other users associated with the most-related text-based descriptions 110 and sending notifications to those users.

Among other things, this approach allows users to discover related information that the users might not have discovered based simply on searching for matching information using specific criteria. For example, in the context of travel, this approach allows users to discover other users who are planning on engaging in related travel, which is not necessarily easily found based on simply searching for overlapping travel itineraries. As a result, collaboration can be improved, travel expenses can be reduced, or other benefits can be obtained (depending in part on the type of information being processed).

Although FIG. 3 illustrates one example of a method 300 for using machine learning to support natural language processing analysis, various changes may be made to FIG. 3. For example, while shown as a series of steps, various steps in FIG. 3 may overlap, occur in parallel, occur in a different order, or occur any number of times. Also, while FIG. 3 illustrates the use of a search for related information based on a user query, this is not necessarily required as noted above. The server 106 may, for instance, process all or a subset of the text-based descriptions 110 in the database 108, identify text-based descriptions 110 that are related based on their vectors, and take action based on these results. In addition, other operations may occur as part of the method 300, such as when the server 106 processes user information to identify possible relationships between users (such as their employment fields or disciplines) and identifies these relationships in the presentation of the most-related information or content based on the most-related information displayed at step 310.

FIG. 4 illustrates an example method 400 for identifying a similarity of information using natural language processing analysis according to this disclosure. The method 400 is generally used to convert documents into vectors, where the vectors represent the underlying meanings or concepts from the documents in numerical form. As noted above, the documents here can include a text-based description associated with a user query and text-based descriptions 110 from the database 108 that are identified based on the user query. The method 400 may, for example, represent the process that can occur as part of step 308 in the method 300 of FIG. 3. For ease of explanation, the method 400 of FIG. 4 may be described as being performed by the server 106 in FIG. 1, which may be implemented using the device 200 of FIG. 2. However, the method 400 may involve the use of any suitable device(s) in any suitable system(s).

As shown in FIG. 4, a term frequency matrix for the various text-based descriptions is calculated at step 402. This may include, for example, the processing device 202 of the server 106 calculating a term frequency matrix in which each column is associated with one of the documents, where the column for a specific document includes multiple values and each value is associated with a different word that is used in the collection of documents. The values in each column can be generated by counting the number of times each word appears in the associated document and then normalizing each count. One example technique for normalizing the counts is described below, although other normalization approaches may be used.

The term frequency matrix for the various text-based descriptions is weighted using local and global weights to generate vectors at step 404. This may include, for example, the processing device 202 of the server 106 using a logarithmic term frequency as the local weight for each value in a column of the term frequency matrix. This may also include the processing device 202 of the server 106 using an inverse document frequency as the global weight for all values in the term frequency matrix. Note, however, that other weights may be used here. This creates an initial vector for the text-based description associated with the user query and an initial vector for each text-based description 110 retrieved from the database 108. Each initial vector may often include numerous values (such as hundreds or thousands of values), which represent many features of the text-based descriptions.

The dimensionality of the vectors is reduced at step 406. This may include, for example, the processing device 202 of the server 106 performing singular value decomposition to reduce the sizes of the initial vectors representing the various text-based descriptions. Singular value decomposition performs two-mode dimensionality reduction on large vectors, transforming the large vectors into smaller vectors having fewer features (which makes them more computationally manageable). Among other things, singular value decomposition can use word co-occurrences (the presence of words located next to or near other words) within each document and shared co-occurrences alongside other terms to identify synonyms and related terms. This produces the final vectors for the various text-based descriptions.

Similarities between the various vectors are determined to identify the similarities of the various text-based descriptions at step 408. This may include, for example, the processing device 202 of the server 106 calculating Euclidean distances, cosine similarities, or other measures between different pairs of vectors. Since the various text-based descriptions are represented as vectors here, calculating the similarity between two vectors provides a measure of the two text-based descriptions' relatedness. In some embodiments, cosine similarity (the cosine of the angle between two vectors in the feature space) can be used since it is a measure of orientation or angular distance and not magnitude. This allows the server 106 to identify related text-based descriptions even if they have different lengths. However, other measurements may also be used, such as when the related text-based descriptions all tend to have lengths of a similar size.

The text-based descriptions retrieved from the database are ranked based on the computed similarities at step 410. This may include, for example, the processing device 202 of the server 106 ranking the text-based descriptions 110 retrieved from the database 108 in order of decreasing similarities.

Although FIG. 4 illustrates one example of a method 400 for identifying a similarity of information using natural language processing analysis, various changes may be made to FIG. 4. For example, while shown as a series of steps, various steps in FIG. 4 may overlap, occur in parallel, occur in a different order, or occur any number of times. Also, the specific technique shown in FIG. 4 does not necessarily need to be used in the method 300 of FIG. 3, and other approaches for using natural language processing analysis may be used in the method 300.

Figure 5:
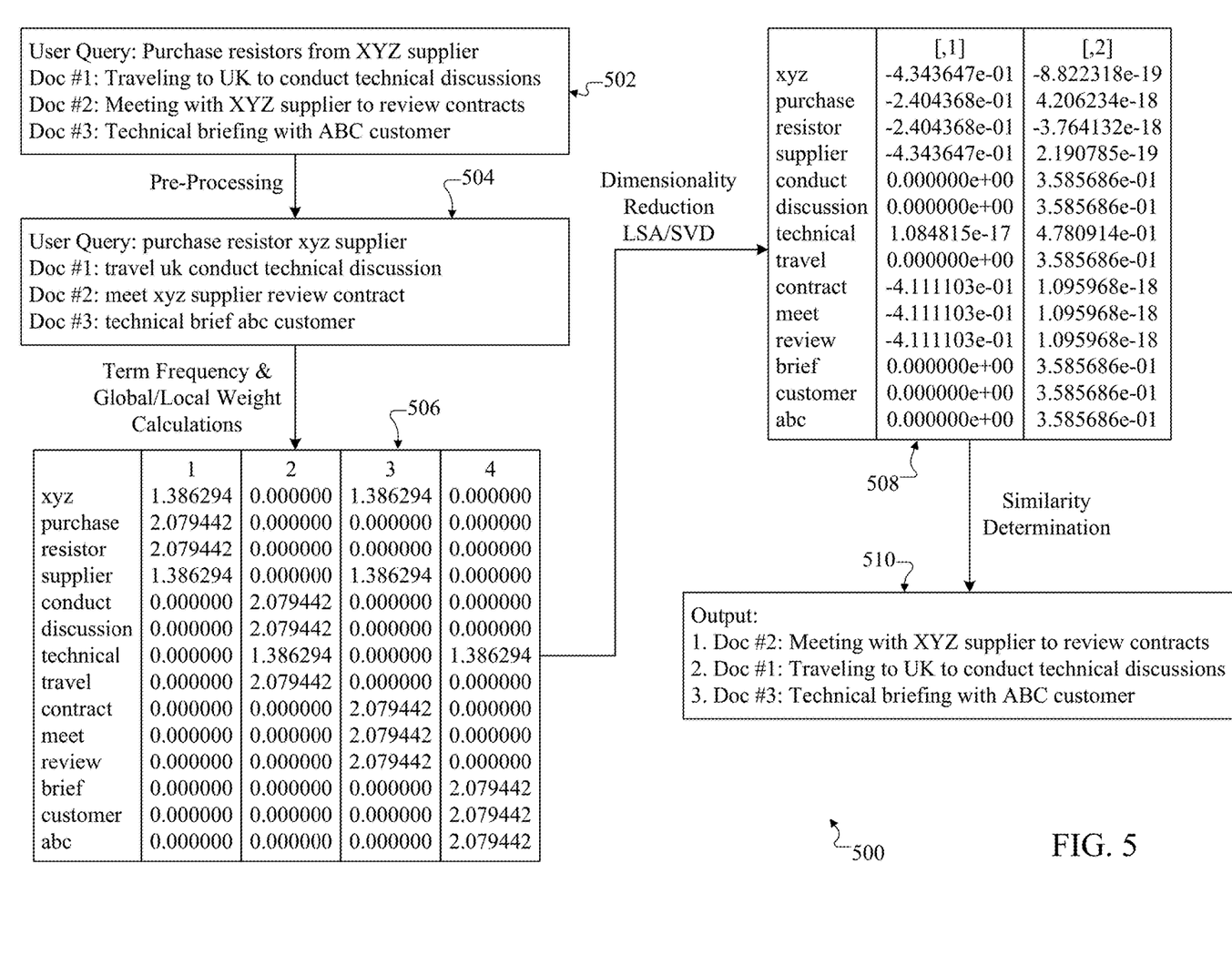
FIG. 5 illustrates an example application of machine learning to support natural language processing analysis according to this disclosure.

FIG. 5 illustrates an example application 500 of machine learning to support natural language processing analysis according to this disclosure. For ease of explanation, the application 500 of FIG. 5 may be described as being provided by the server 106 in FIG. 1, which may be implemented using the device 200 of FIG. 2. However, the application 500 may involve the use of any suitable device(s) in any suitable system(s).

As shown in FIG. 5, a set of documents 502 has been obtained by the server 106. The documents 502 here include a text-based description associated with a user query and three text-based descriptions retrieved from the database 108. As described above, the three text-based descriptions may be retrieved from the database 108 based on the original user query, such as based on overlapping itineraries of the user who submitted the query and other users associated with the three text-based descriptions.

The documents 502 are pre-processed to generate a set of pre-processed documents 504. As described above, the pre-processing can include removing capitalization, punctuation, extra white spaces, and stop words, changing plural nouns to the singular form, converting all verb tenses to present tense, and otherwise converting the documents 502 into a standardized form for easier processing.

The server 106 uses the pre-processed documents 504 to generate multiple vectors 506, which can be generated by producing a term frequency matrix for the document 504 and applying local and global weights to the term frequency matrix. In this example, there are four vectors 506 numbered "1" through "4", where the vector 506 numbered "1" corresponds to the pre-processed text-based description associated with the user query and the vectors 506 numbered "2" through "4" correspond respectively to the three pre-processed text-based descriptions retrieved from the database 108.

The vectors 506 undergo dimensionality reduction to produce a truncated term matrix 508, such as through the use of singular value decomposition. The truncated term matrix 508 embeds the vectors 506 in a feature space. Based on cosine similarity or other similarity measurements, an output 510 can be generated that ranks the three text-based descriptions retrieved from the database 108 in order of decreasing similarity (as compared to the user's text-based description).

As can be seen in this example, the approaches described in this patent document can be used to perform natural language processing analysis in order to identify the similarities of various free-form text-based descriptions provided by users. In the context of travel, this may help a specified user learn of the same or similar activities being performed by other users at or around the same or similar time that the specified user is traveling.

Although FIG. 5 illustrates one example of an application 500 of machine learning to support natural language processing analysis, various changes may be made to FIG. 5. For example, the functionality for using machine learning to support natural language processing analysis may be used in any other suitable manner and is not limited to the specific example shown here.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable storage device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A system comprising:
    at least one memory configured to store multiple free-form text-based descriptions comprising descriptions of upcoming travels by multiple users, wherein a first free-form text-based description of the multiple free-form text-based descriptions is associated with travel of a specified user of the multiple users, wherein multiple second free-form text-based descriptions of the multiple free-form text-based descriptions are associated with travel of one or more other users of the multiple users; and
    at least one processor coupled to the at least one memory and configured to:
        perform natural language processing to generate vectors representing the free-form text-based descriptions in a feature space;
        identify similarities between multiple pairs of the vectors in the feature space, wherein each of the multiple pairs of the vectors includes a vector associated with the first free-form text-based description and a vector associated with a different one of the second free-form text-based descriptions;
        identify at least two of the free-form text-based descriptions as being related based on the identified similarities; and
        generate an output indicating that the at least two free-form text-based descriptions are associated with related travels by at least two users.

2. The system of claim 1, wherein, to perform the natural language processing, the at least one processor is configured to:
    calculate a term frequency matrix associated with the free-form text-based descriptions, the term frequency matrix containing multiple values where each value is based on a number of times a different term appears in one of the free-form text-based descriptions;
    weight the values in the term frequency matrix using local and global weights to generate initial vectors, each local weight associated with one of the free-form text-based descriptions, the global weights associated with the free-form text-based descriptions; and
    reduce a dimensionality of the initial vectors to generate the vectors representing the free-form text-based descriptions in the feature space.

3. The system of claim 2, wherein:
    the at least one processor is configured to perform singular value decomposition of the initial vectors to reduce the dimensionality of the initial vectors; and
    the similarities comprise cosine similarities.

4. The system of claim 3, wherein, to identify the at least two free-form text-based descriptions as being related, the at least one processor is configured to determine, for each of the pairs of the vectors in the feature space, whether the cosine similarity for the vectors exceeds a threshold value.

5. The system of claim 1, wherein:
    the at least one processor is configured to rank the at least two free-form text-based descriptions in order of decreasing relatedness; and
    to generate the output, the at least one processor is configured to generate a list of the at least two free-form text-based descriptions as ranked.

6. The system of claim 1, wherein, to generate the output, the at least one processor is configured to generate one or more notifications for one or more users identifying the at least two related free-form text-based descriptions as being related.

7. The system of claim 1, wherein:
    the at least one processor is further configured to retrieve the free-form text-based descriptions from a database based on a user query from the specified user;
    the user query is associated with an itinerary for the specified user; and
    the retrieved free-form text-based descriptions are identified as being associated with itineraries for the one or more other users that at least partially overlap with the itinerary for the specified user.

8. A non-transitory computer readable medium containing instructions that when executed cause at least one processor to:
    obtain multiple free-form text-based descriptions comprising descriptions of upcoming travels by multiple users, wherein a first free-form text-based description of the multiple free-form text-based descriptions is associated with travel of a specified user of the multiple users, wherein multiple second free-form text-based descriptions of the multiple free-form text-based descriptions are associated with travel of one or more other users of the multiple users;
    perform natural language processing to generate vectors representing the free-form text-based descriptions in a feature space;
    identify similarities between multiple pairs of the vectors in the feature space, wherein each of the multiple pairs of the vectors includes a vector associated with the first free-form text-based description and a vector associated with a different one of the second free-form text-based descriptions;
    identify at least two of the free-form text-based descriptions as being related based on the identified similarities; and
    generate an output indicating that the at least two free-form text-based descriptions are associated with related travels by at least two users.

9. The non-transitory computer readable medium of claim 8, wherein the instructions that when executed cause the at least one processor to perform the natural language processing comprise:
    instructions that when executed cause the at least one processor to:
        calculate a term frequency matrix associated with the free-form text-based descriptions, the term frequency matrix containing multiple values where each value is based on a number of times a different term appears in one of the free-form text-based descriptions;

weight the values in the term frequency matrix using local and global weights to generate initial vectors, each local weight associated with one of the free-form text-based descriptions, the global weights associated with the free-form text-based descriptions; and reduce a dimensionality of the initial vectors to generate the vectors representing the free-form text-based descriptions in the feature space.

10. The non-transitory computer readable medium of claim 9, wherein:

the instructions that when executed cause the at least one processor to reduce the dimensionality of the initial vectors comprise:

instructions that when executed cause the at least one processor to perform singular value decomposition of the initial vectors; and the similarities comprise cosine similarities.

11. The non-transitory computer readable medium of claim 10, wherein the instructions that when executed cause the at least one processor to identify the at least two free-form text-based descriptions as being related comprise:

instructions that when executed cause the at least one processor to determine, for each of the pairs of the vectors in the feature space, whether the cosine similarity for the vectors exceeds a threshold value.

12. The non-transitory computer readable medium of claim 8, further containing instructions that when executed cause the at least one processor to rank the at least two free-form text-based descriptions in order of decreasing relatedness;

wherein the instructions that when executed cause the at least one processor to generate the output comprise:

instructions that when executed cause the at least one processor to generate a list of the at least two free-form text-based descriptions as ranked.

13. The non-transitory computer readable medium of claim 8, wherein the instructions that when executed cause the at least one processor to generate the output comprise:

instructions that when executed cause the at least one processor to generate one or more notifications for one or more users identifying the at least two related free-form text-based descriptions as being related.

14. The non-transitory computer readable medium of claim 8, further containing instructions that when executed cause the at least one processor to retrieve the free-form text-based descriptions from a database based on a user query from the specified user;

wherein the user query is associated with an itinerary for the specified user; and wherein the retrieved free-form text-based descriptions are identified as being associated with itineraries for the one or more other users that at least partially overlap with the itinerary for the specified user.

15. A method comprising:

obtaining multiple free-form text-based descriptions comprising descriptions of upcoming travels by multiple users, wherein a first free-form text-based description of the multiple free-form text-based descriptions is associated with travel of a specified user of the multiple users, wherein multiple second free-form text-based descriptions of the multiple free-form text-based descriptions are associated with travel of one or more other users of the multiple users;

performing natural language processing to generate vectors representing the free-form text-based descriptions in a feature space;

identifying similarities between multiple pairs of the vectors in the feature space, wherein each of the multiple pairs of the vectors includes a vector associated with the first free-form text-based description and a vector associated with a different one of the second free-form text-based descriptions;

identifying at least two of the free-form text-based descriptions as being related based on the identified similarities; and generating an output indicating that the at least two free-form text-based descriptions are associated with related travels by at least two users.

16. The method of claim 15, wherein performing the natural language processing comprises:

calculating a term frequency matrix associated with the free-form text-based descriptions, the term frequency matrix containing multiple values where each value is based on a number of times a different term appears in one of the free-form text-based descriptions;

weighting the values in the term frequency matrix using local and global weights to generate initial vectors, each local weight associated with one of the free-form text-based descriptions, the global weights associated with the free-form text-based descriptions; and reducing a dimensionality of the initial vectors to generate the vectors representing the free-form text-based descriptions in the feature space.

17. The method of claim 15, wherein generating the output comprises generating one or more notifications for one or more users identifying the at least two related free-form text-based descriptions as being related.

18. The method of claim 15, wherein:

the method further comprises retrieving the free-form text-based descriptions from a database based on a user query from the specified user;

the user query is associated with an itinerary for the specified user; and the retrieved free-form text-based descriptions are identified as being associated with itineraries for the one or more other users that at least partially overlap with the itinerary for the specified user.

19. The method of claim 16, further comprising:

performing singular value decomposition of the initial vectors to reduce the dimensionality of the initial vectors;

wherein the similarities comprise cosine similarities.

20. The method of claim 19, wherein identifying the at least two free-form text-based descriptions as being related comprises:

determining, for each of the pairs of the vectors in the feature space, whether the cosine similarity for the vectors exceeds a threshold value.

* * * * *